(12) United States Patent
Holtzman et al.

(10) Patent No.: US 8,688,924 B2
(45) Date of Patent: *Apr. 1, 2014

(54) METHOD FOR IMPROVING ACCURACY OF A TIME ESTIMATE FROM A MEMORY DEVICE

(75) Inventors: Michael Holtzman, Cupertino, CA (US); Rotem Sela, Maalot (IL); Ron Barzilai, Cupertino, CA (US); Fabrice E. Jogand-Coulomb, San Carlos, CA (US)

(73) Assignee: SanDisk Technologies Inc., Plano, TX (US)

( * ) Notice: Subject to any disclaimer, the term of this patent is extended or adjusted under 35 U.S.C. 154(b) by 419 days.

This patent is subject to a terminal disclaimer.

(21) Appl. No.: 11/811,284

(22) Filed: Jun. 8, 2007

(65) Prior Publication Data
US 2008/0306710 A1  Dec. 11, 2008

(51) Int. Cl.
*G06F 21/78* (2013.01)
*G01D 18/00* (2006.01)

(52) U.S. Cl.
USPC ............. 711/154; 711/163; 702/89; 702/176; 700/306

(58) Field of Classification Search
USPC .................... 702/176, 178, 89; 711/154, 163; 700/306
See application file for complete search history.

(56) References Cited

U.S. PATENT DOCUMENTS

| 5,444,780 | A | 8/1995 | Hartman, Jr. |
| 5,881,022 | A * | 3/1999 | Morganstein ................... 368/46 |
| 5,892,900 | A | 4/1999 | Ginter et al. |
| 6,367,013 | B1 | 4/2002 | Bisbee et al. |
| 6,556,512 | B1 * | 4/2003 | Winkler ........................ 368/47 |
| 6,557,102 | B1 | 4/2003 | Wong et al. |
| 6,728,466 | B1 | 4/2004 | Tanaka |
| 6,728,880 | B1 | 4/2004 | Sites |
| 7,076,624 | B2 * | 7/2006 | Shaath et al. ................. 711/163 |
| 7,194,092 | B1 | 3/2007 | England et al. |
| 7,219,234 | B1 | 5/2007 | Ashland et al. |
| 7,228,437 | B2 | 6/2007 | Spagna et al. |
| 7,536,524 | B2 * | 5/2009 | Shaath et al. ................. 711/163 |

(Continued)

FOREIGN PATENT DOCUMENTS

| CN | 1540657 | 10/2004 |
| DE | 102005050352 A1 | 4/2007 |

(Continued)

OTHER PUBLICATIONS

How to Quantify Downtime; Pisello et al.; Jan. 5, 2004; Network World.*

(Continued)

*Primary Examiner* — Sanjiv Shah
*Assistant Examiner* — Samuel Dillon
(74) *Attorney, Agent, or Firm* — Brinks Gilson & Lione (57) ABSTRACT

A method for improving accuracy of a time estimate from a memory device is disclosed. In one embodiment, a memory device receives a time stamp and measures active time with respect to the received time stamp. The memory device determines accuracy of previously-measured active time and generates a time estimate using the measured active time, the accuracy of previously-measured active time, and the received time stamp. In another embodiment, measured active time is adjusted, with or without generating a time estimate. Other embodiments are disclosed, and each of the embodiments can be used alone or together in combination.

48 Claims, 6 Drawing Sheets

(56) References Cited

U.S. PATENT DOCUMENTS

| | | | |
|---|---|---|---|
| 7,536,609 B2 * | 5/2009 | Nakamura et al. | 714/55 |
| 7,590,600 B2 | 9/2009 | Bovee et al. | |
| 7,793,135 B2 * | 9/2010 | Dinescu | 713/600 |
| 7,831,644 B2 | 11/2010 | Moritani et al. | |
| 7,831,795 B2 | 11/2010 | Prahlad et al. | |
| 7,891,009 B2 * | 2/2011 | Jennings et al. | 726/27 |
| 8,224,752 B2 * | 7/2012 | Read et al. | 705/59 |
| 8,346,807 B1 * | 1/2013 | Diamond et al. | 707/783 |
| 2001/0054134 A1 * | 12/2001 | Nagatomo et al. | 711/163 |
| 2002/0013772 A1 | 1/2002 | Peinado | |
| 2002/0120465 A1 | 8/2002 | Mori et al. | |
| 2002/0169974 A1 | 11/2002 | McKune | |
| 2002/0194010 A1 | 12/2002 | Bergler et al. | |
| 2003/0069854 A1 | 4/2003 | Hsu et al. | |
| 2003/0115469 A1 | 6/2003 | Shippy et al. | |
| 2004/0199578 A1 | 10/2004 | Kapczynski et al. | |
| 2004/0215909 A1 * | 10/2004 | Imai et al. | 711/163 |
| 2005/0038757 A1 | 2/2005 | Wada | |
| 2005/0100113 A1 | 5/2005 | Corts et al. | |
| 2005/0181761 A1 * | 8/2005 | Park | 455/410 |
| 2005/0187943 A1 | 8/2005 | Finke-Anlauff et al. | |
| 2006/0095553 A1 | 5/2006 | Ogawa et al. | |
| 2006/0107042 A1 * | 5/2006 | Kohmoto | 713/158 |
| 2006/0218404 A1 | 9/2006 | Ogura | |
| 2006/0242068 A1 | 10/2006 | Jogan-Coulomb et al. | |
| 2006/0248596 A1 * | 11/2006 | Jain et al. | 726/27 |
| 2006/0282696 A1 | 12/2006 | Inagaki | |
| 2006/0294593 A1 | 12/2006 | Eldar et al. | |
| 2007/0043667 A1 | 2/2007 | Qawami et al. | |
| 2007/0056042 A1 | 3/2007 | Qawami et al. | |
| 2007/0083763 A1 | 4/2007 | Itoh et al. | |
| 2007/0110074 A1 * | 5/2007 | Bradley et al. | 370/395.51 |
| 2007/0118608 A1 | 5/2007 | Egli | |
| 2007/0197197 A1 | 8/2007 | Minear | |
| 2007/0266256 A1 | 11/2007 | Shah et al. | |
| 2008/0010450 A1 | 1/2008 | Holtzman et al. | |
| 2008/0086423 A1 | 4/2008 | Waites | |
| 2008/0168247 A1 * | 7/2008 | Goodwill et al. | 711/163 |
| 2008/0270308 A1 | 10/2008 | Peterka et al. | |
| 2008/0304364 A1 | 12/2008 | Holtzman et al. | |
| 2008/0307158 A1 | 12/2008 | Sinclair | |
| 2008/0307494 A1 | 12/2008 | Holtzman et al. | |
| 2008/0307495 A1 | 12/2008 | Holtzman et al. | |
| 2009/0113536 A1 * | 4/2009 | Zhang et al. | 726/12 |
| 2009/0133116 A1 * | 5/2009 | Waisbard et al. | 726/17 |
| 2009/0287942 A1 | 11/2009 | Betouin et al. | |
| 2010/0024000 A1 | 1/2010 | Holtzman et al. | |

FOREIGN PATENT DOCUMENTS

| | | |
|---|---|---|
| EP | 0586256 B1 * | 3/1994 |
| EP | 1081577 A2 * | 3/2001 |
| EP | 1 094 374 | 4/2001 |
| EP | 1 094 374 A | 4/2001 |
| EP | 1094374 A1 * | 4/2001 |
| GB | 2 316 517 A | 2/1998 |
| JP | H07-036559 | 2/1995 |
| JP | 2001-505341 | 4/2001 |
| JP | 2001-159690 | 6/2001 |
| JP | 2003-296278 | 10/2003 |
| JP | 2004-003928 | 1/2004 |
| JP | 2004-021341 | 1/2004 |
| JP | 2004-038247 | 2/2004 |
| JP | 2004-056793 | 2/2004 |
| JP | 2004-171544 | 6/2004 |
| JP | 2004-320510 | 11/2004 |
| JP | 2004-326278 | 11/2004 |
| JP | 2005-063079 | 3/2005 |
| JP | 2005-165963 | 6/2005 |
| JP | 2005-250613 | 9/2005 |
| JP | 2005-301333 | 10/2005 |
| JP | 2005-331461 | 12/2005 |
| JP | 2006-338583 | 12/2006 |
| JP | 2006/350496 | 12/2006 |
| JP | 2007-157135 | 6/2007 |
| WO | WO 2004/075525 | 9/2004 |
| WO | WO 2004/075525 A | 9/2004 |
| WO | WO 2004075525 A1 * | 9/2004 |
| WO | WO 2006/018864 | 2/2006 |
| WO | WO 2006/069194 | 6/2006 |
| WO | WO 2007/030760 | 3/2007 |
| WO | WO 2007/148319 A | 12/2007 |
| WO | WO 2007148319 A2 * | 12/2007 |

OTHER PUBLICATIONS

Network Time Protocol (Version 3) Specification, Implementation and Analysis; David L. Mills; Network Working Group; Mar. 1992.*

Standard Deviation and Variance; QuickMBA; Sep. 19, 2002.*

International Search Report and Written Opinion for PCT Application Serial No. PCT/US08/065968, dated Aug. 29, 2008, 12 pages.

International Search Report and Written Opinion for PCT Application Serial No. PCT/US08/065970, dated Aug. 29, 2008, 12 pages.

International Search Report and Written Opinion for PCT Application Serial No. PCT/US08/065967, dated Nov. 12, 2008, 10 pages.

U.S. Appl. No. 11/811,289, entitled, "Method for Improving Accuracy of a Time Estimate Used to Authenticate an Entity to a Memory Device", filed Jun. 8, 2007.

U.S. Appl. No. 11/811,344, entitled, "Memory Device With Circuitry for Improving Accuracy of a Time Estimate Used to Authenticate an Entity", filed Jun. 8, 2007.

U.S. Appl. No. 11/811,345, entitled, "Memory Device Using Time from a Trusted Host Device", filed Jun. 8, 2007.

U.S. Appl. No. 11/811,346, entitled, "Method for Using Time from a Trusted Host Device", filed Jun. 8, 2007.

U.S. Appl. No. 11/811,347, entitled, "Memory Device with Circuitry for Improving Accuracy of a Time Estimate", filed Jun. 8, 2007.

U.S. Appl. No. 11/811,348, entitled, "Memory Device with Circuitry for Improving Accuracy of a Time Estimate Used in Digital Rights Management (DRM) License Validation", filed Jun. 8, 2007.

U.S. Appl. No. 11/811,354, entitled, "Method for Improving Accuracy of a Time Estimate Used in Digital Rights Management (DRM) License Validation", filed Jun. 8, 2007.

International Search Report and Written Opinion for PCT Application Serial No. PCT/US08/065965, dated Jun. 15, 2009, 14 pages.

Hardware White Paper, "Microsoft Extensible Firmware Initiative FAT32 File System Specification", Version 1.03, Dec. 2000, 34 pages.

European Examination Report for European Patent Application Serial No. 08 756 739.2 dated Aug. 23, 2010, 4 pages.

European Examination Report for European Patent Application Serial No. 08 770 229.6 dated Aug. 23, 2010, 5 pages.

European Examination Report for European Patent Application Serial No. 08 780 764.0 dated Aug. 23, 2010, 4 pages.

Office Action for U.S. Appl. No. 11/811,289, dated Jun. 30, 2010, 20 pages.

Office Action for U.S. Appl. No. 11/811,344, dated Jun. 10, 2010, 7 pages.

Office Action for U.S. Appl. No. 11/811,345, dated Jun. 10, 2010, 12 pages.

Office Action for U.S. Appl. No. 11/811,346, dated Aug. 16, 2010, 17 pages.

Office Action for U.S. Appl. No. 11/811,348, dated Aug. 13, 2010, 11 pages.

Office Action for U.S. Appl. No. 11/811,354, dated Jul. 20, 2010, 12 pages.

Office Action for U.S. Appl. No. 11/811,289, dated Jan. 18, 2011, 22 pages.

Office Action for U.S. Appl. No. 11/811,346, dated Feb. 1, 2011, 25 pages.

Office Action for U.S. Appl. No. 11/811,354, dated Feb. 23, 2011, 13 pages.

Office Action for U.S. Appl. No. 11/811,347, dated Mar. 24, 2011, 32 pages.

Office Action for U.S. Appl. No. 11/811,346, dated Jul. 20, 2011, 25 pages.

Translation of Office Action for Chinese Patent Application Serial No. 200880019347.3, dated May 25, 2011, 5 pages.

(56) References Cited

OTHER PUBLICATIONS

Notification for Reasons for Refusal for Japanese Patent Application Serial No. 2010-511333, dated Aug. 21, 2012, 5 pages.
Notification for Reasons for Refusal for Japanese Patent Application Serial No. 2010-511335, dated Aug. 21, 2012, 4 pages.
Office Action for Chinese Patent Application Serial No. 2008801024434 dated Aug. 2, 2012, 18 pages.
Office Action for U.S. Appl. No. 11/811,289, dated Oct. 13, 2011, 23 pages.
Office Action for Chinese Patent Application Serial No. 2008801024434.4, dated Oct. 17, 2011, 13 pages.
Office Action for Chinese Patent Application Serial No. 2008801012320.0, dated Nov. 3, 2011, 11 pages.
Office Action for Chinese Patent Application Serial No. 200880123179, dated Dec. 21, 2011, 13 pages.
Office Action for Chinese Patent Application Serial No. 2008801002317.9, dated Sep. 25, 2012, 5 pages.
Office Action for Chinese Patent Application Serial No. 2008801023200, dated Sep. 21, 2012, 13 pages.
Office Action for Taiwanese Patent Application Serial No. 097121254, dated Aug. 13, 2012, 10 pages.
Notification of Reasons for Refusal for Japanese Patent Application Serial No. 2010-511334, dated Nov. 6, 2012, 8 pages.
Office Action for U.S. Appl. No. 11/811,289, dated Mar. 2, 2012, 25 pages.
Office Action for U.S. Appl. No. 12/542,254, dated Mar. 1, 2012, 23 pages.
Notification of Reasons for Refusal for Japanese Application Serial No. 2010-511336, dated Feb. 28, 2012, 4 pages.
Office Action for U.S. Appl. No. 12/542,254, dated Jul. 10, 2012, 25 pages.
Office Action for Chinese Patent Application Serial No. 008800193473, dated Apr. 28, 2012, 5 pages.
Office Action for Japanese Patent Application Serial No. 2010-511333, dated May 8, 2012, 9 pages.
Office Action for Japanese Patent Application Serial No. 2010-511335, dated May 8, 2012, 6 pages.
Office Action for Taiwanese Patent Application Serial No. 097121272, dated May 11, 2012, 10 pages.
Decision for Refusal for Japanese Patent Application Serial No. 2010-511336, dated Dec. 11, 2012, 4 pages.
Office Action for U.S. Appl. No. 11/811,289, dated Feb. 21, 2013, 47 pages.
Notice of Allowance for U.S. Appl. No. 12/542,254, dated Mar. 4, 2013, 19 pages.
Office Action for Taiwanese Patent Application Serial No. 097121262, dated Jan. 21, 2013, 6 pages.
Office Action for Taiwanese Patent Application Serial No. 097121269, dated Feb. 4, 2013, 4 pages.
Office Action for Chinese Patent Application Serial No. 2008801023200, dated Apr. 15, 2013, 9 pages.
Office Action for Chinese Patent Application Serial No. 2008801024434, dated Feb. 18, 2013, 4 pages.
Office Action for European Patent Application Serial No. 08 756 739.2, dated Mar. 18, 2013, 4 pages.
Office Action for European Patent Application Serial No. 08 770 229.6, dated Mar. 18, 2013, 7 pages.
Office Action for European Patent Application Serial No. 08 780 764.0, dated Mar. 18, 2013, 7 pages.
Office Action for U.S. Appl. No. 11/811,289 dated Jul. 17, 2013, 50 pages.
Office Action for U.S. Appl. No. 11/811,346 dated Sep. 10, 2013, 17 pages.
English Translation of Office Action for Chinese Patent Application Serial No. 2008801024434 dated Aug. 23, 2013, 10 pages.
Notice of Allowance for U.S. Appl. No. 13/862,978 dated Oct. 3, 2013, 24 pages.
Office Action for European Patent Application Serial No. 08 756 738.4 dated Nov. 6, 2013, 6 pages.

* cited by examiner

METHOD FOR IMPROVING ACCURACY OF A TIME ESTIMATE FROM A MEMORY DEVICE

CROSS-REFERENCE TO RELATED APPLICATIONS

This application is related to "Memory Device with Circuitry for Improving Accuracy of a Time Estimate," U.S. patent application Ser. No. 11/811,347; "Method for Improving Accuracy of a Time Estimate Used to Authenticate an Entity to a Memory Device," U.S. patent application Ser. No. 11/811,289; "Memory Device with Circuitry for Improving Accuracy of a Time Estimate Used to Authenticate an Entity," U.S. patent application Ser. No. 11/811,344; "Method for Improving Accuracy of a Time Estimate Used in Digital Rights Management (DRM) License Validation," U.S. patent application Ser. No. 11/811,354; "Memory Device with Circuitry for Improving Accuracy of a Time Estimate Used in Digital Rights Management (DRM) License Validation," U.S. patent application Ser. No. 11/811,348; "Method for Using Time from a Trusted Host Device," U.S. patent application Ser. No. 11/811,346; and "Memory Device Using Time from a Trust Host Device," U.S. patent application Ser. No. 11/811,345; each of which is being filed herewith and is hereby incorporated by reference.

BACKGROUND

Some memory devices, such as TrustedFlash™ memory devices from SanDisk Corporation, need to know the time in order to perform time-based operations, such as digital rights management (DRM) license validation. Because of the security issues involved in such operations, the memory device may not be able to trust a host device to provide the correct time. While the memory device may be able to obtain the correct time from a trusted component in a network, the host device hosting the memory device may not be connected to the network at the time the memory device needs to know the time. The memory device can be designed to measure its active time, but a time estimate generated from measured active time will not be a true measure of the actual time if the memory device does not continuously measure active time (e.g., if the memory device was powered down after the measurement started). Accordingly, a time estimate generated from the measured active time really only indicates a lower limit of what the actual time could be, and such a time estimate may not provide the accuracy that is desired in certain time-based operations. While a memory device can be equipped with a battery-backed-up clock to continuously keep track of time even when the memory device is inactive, such a clock may add cost to the memory device.

SUMMARY

The present invention is defined by the claims, and nothing in this section should be taken as a limitation on those claims.

By way of introduction, the embodiments described below provide a method for improving accuracy of a time estimate from a memory device. In one embodiment, a memory device receives a time stamp and measures active time with respect to the received time stamp. The memory device determines accuracy of previously-measured active time and generates a time estimate using the measured active time, the accuracy of previously-measured active time, and the received time stamp. In another embodiment, measured active time is adjusted, with or without generating a time estimate. Other embodiments are disclosed, and each of the embodiments can be used alone or together in combination.

The embodiments will now be described with reference to the attached drawings.

DETAILED DESCRIPTION OF THE PRESENTLY PREFERRED EMBODIMENTS

Figure 1:
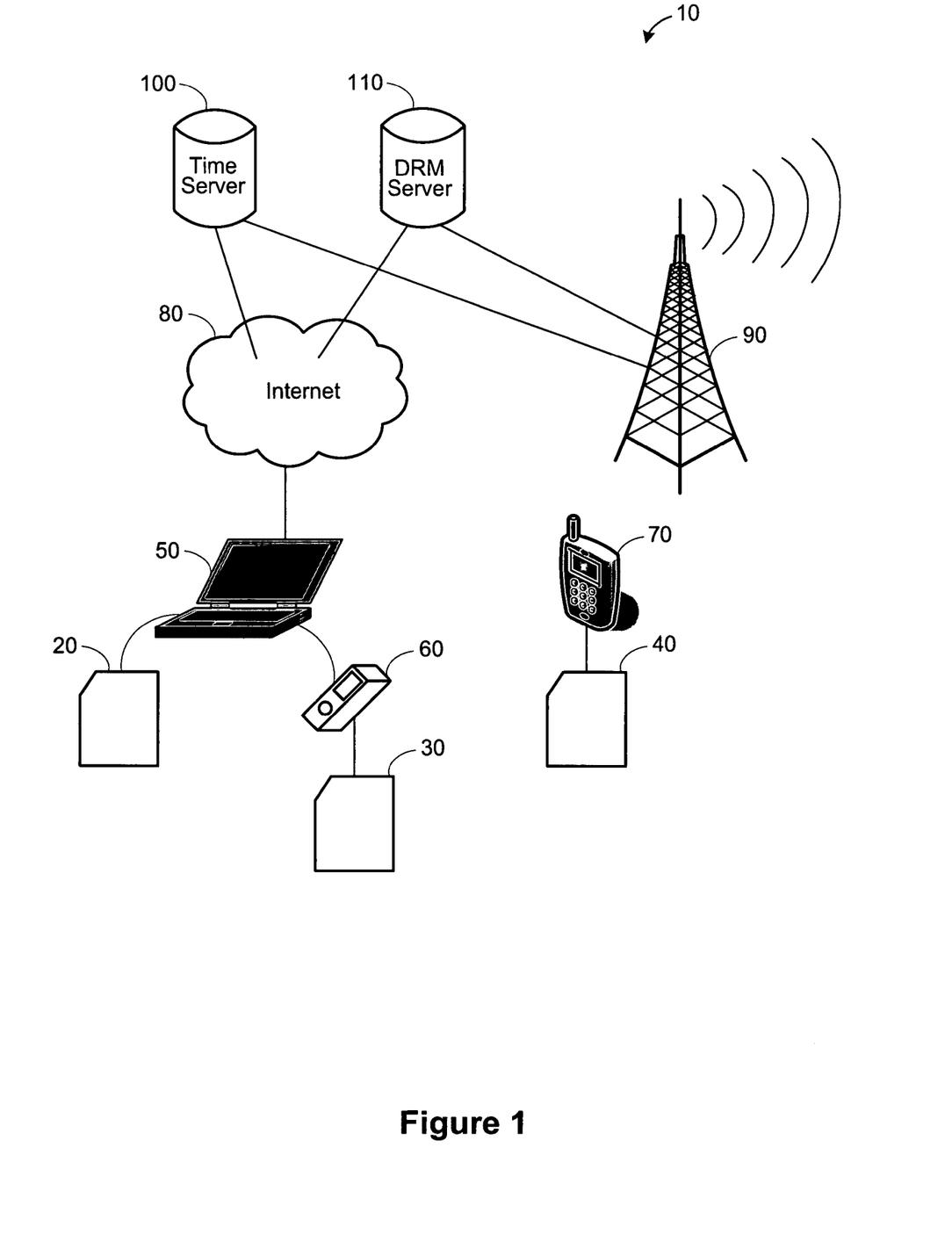
FIG. 1 is an illustration of a system of an embodiment.

The embodiments described below relate to a memory device and method for improving accuracy of a time estimate. FIG. 1 is an illustration of a system 10 that will be used to illustrate these embodiments. As shown in FIG. 1, the system 10 comprises a plurality of memory devices 20, 30, 40 removably connected with a respective plurality of host devices: a personal computer (PC) 50, a digital media (e.g., MP3) player 60, and cell phone 70. A host device is a device that can read data from and/or write data to a memory device. Data can include, but is not limited to, digital media content, such as an audio file or a video file (with or without audio), an image, a game, a book, a map, a data file, or a software program. Data can be downloaded onto a memory device from a server in a network, pre-loaded by a manufacturer or other third party, or side-loaded from another device, for example.

A host device can take any suitable form and is not limited to the examples shown in FIG. 1. For example, a host device can take the form of a notebook computer, a handheld computer, a handheld email/text message device, a handheld game console, a video player (e.g., a DVD player or a portable video player), an audio and/or video recorder, a digital camera, a set-top box, a display device (e.g., a television), a printer, a car stereo, and a navigation system. Also, a host device can contain mixed functionality. For example, a host device can be a cell phone that, in addition to being able to make and receive telephone calls, is also able to play digital media (e.g., music and/or video) files.

A host device, like the PC 50 and cell phone 70, can have the capability of communicatively connecting to a network (such as the Internet 80 or a wireless network 90, although other types of networks can be used). A host device with such capability will be referred to herein as a "connected device." It should be understood that a "connected device" may not always actually be connected to a network, such as when the cell phone 70 is operating in an unconnected mode or when the PC 50 does not establish an Internet connection. A host device that, by itself, does not have the capability of communicatively connecting to a network (such as the digital media player 60) will be referred to herein as an "unconnected device." An unconnected device can be placed in communication with a network by connecting the unconnected device with a connected device, as shown in FIG. 1, where the digital media player 60 is connected to the PC 50. Even if connected in such a way, an unconnected device may not be able to pull information from the network if the unconnected device is not designed for such functionality (e.g., a simple MP3 player).

In such a situation, a component in the network can push information to the device. It should be noted that while FIG. 1 shows the digital media player 60 being connected to the PC 50 via a wired connection, a wireless connection can be used. Similarly, the terms "connected" and "coupled" do not necessarily denote a wired connection or a direct connection.

The network (e.g., the Internet 80 or the wireless network 90) can allow a connected device (or an unconnected device connected to a connected device) to access external components, such as, but not limited to, a time server 100, which can provide a time stamp, and a digital rights management server (DRM) 110, which can provide DRM-protected content and licenses for accessing such content. Both of these servers will be described in more detail below. While the time server 100 and the DRM server 110 are shown as separate devices in FIG. 1, these two servers can be combined into a single device. Further, these servers can contain other functionality. Also, components other than the time server 100 and DRM server 110 can be accessed via the Internet 80 and wireless network 90, if desired.

In various situations, there is a need to know what time it is. For example, if a license to DRM-protected content on a memory device states that access to the content expires at a certain time, the entity responsible for validating the license needs to compare the current time with the expiration time to determine if access has expired. In some environments, the memory device is a "dumb" storage device, and the host device is responsible for performing time-based processing (e.g., validating a DRM license with host-specific DRM keys). In these environments, if the host device were a connected device, such as the PC 50 or the cell phone 70 operating in a connected mode, the host device can get a time stamp with the current time from the time server 100, which is a trusted source of time. Unconnected host devices, such as the digital media player 60 or the cell phone 70 operating in an unconnected mode, could be equipped with a battery backed-up clock that would keep track of the time. Time stamps can still be used with these devices to recalibrate their battery backed-up clocks in the event that the clocks lose accuracy over a long period of time.

One disadvantage of such host devices is that host-specific DRM keys, which are used to validate the DRM license, cannot be moved. This effectively ties the protected content to a particular host device. In order to overcome this disadvantage, DRM keys and licenses can be issued to the memory device. Since the DRM keys and licenses move along with the memory device, the protected content is effectively tied to the memory device instead of the host device, thereby making the protected content portable and accessible by any host device that can prove to the memory device that it is an authorized device. In this situation, the memory device can contain the functionality to validate the DRM license with the DRM keys stored on the memory device. Alternatively, the memory device can provide the DRM keys to the host device for it to validate the DRM license with the DRM keys. Trusted-Flash™ memory devices from SanDisk Corporation are examples of memory devices that store DRM keys and licenses on the memory device, so that protected content is movable with the memory device.

In this environment, instead of being a "dumb" storage device, the memory device has the processing capability to allow content to be read out of the memory device only if the entity asking for the content is an authorized entity and if the license terms for that content are validated. For both of these functions, the memory device needs to know the current time. For example, in public key infrastructure (PKI) authentication, authentication of an entity is based on credentials (e.g., an RSA certificate), which have an expiration time. So, in order to validate an RSA certificate provided by an entity, the memory device needs to know what time it is. Similarly, a content usage license can have a time restriction (e.g., a song can only be played for one month, a movie can only be watched for one day, etc.), and the memory device needs to know the time in order to validate the license. Accordingly, the memory device needs some mechanism to keep track of time.

One option is to have the memory device request, via a host device, a time stamp from a trusted time server every time the memory device needs to know the time. This solution is suitable for connected devices; however, since the memory device can be used in both connected devices as well as unconnected devices (e.g., home PCs that are not connected to the Internet, MP3 players, cell phones that are off the network (e.g., when on an airplane)), the memory device cannot rely on connectivity being available when it needs to know the time. Another option is to equip the memory device with a battery-backed-up clock. However, this may be undesired, as it would add cost to the memory device. Yet another option is to rely upon the host device to provide time (from its own internal clock or from an external source) to the memory device. However, in many situations, the memory device cannot trust the host device to provide accurate time. If a user is allowed to "back date" the clock on the host device (i.e., setting the clock on the host device to an earlier time than the current time), the user would be able to circumvent the very time restrictions that the memory device needs to enforce. On the other hand, if the memory device can trust the host device, the memory device would be able to rely upon the host device for the time. "Method for Using Time from a Trusted Host Device," U.S. patent application Ser. No. 11/811,346 and "Memory Device Using Time from a Trust Host Device," U.S. patent application Ser. No. 11/811,345, each of which is being filed herewith and is hereby incorporated by reference, describe a technique for determining whether a memory device can rely upon a host device for the time. Another option is to enhance the limited time tracking capabilities of a memory device. Before turning to this option, a general overview of a memory device of an embodiment is provided.

Figure 2:
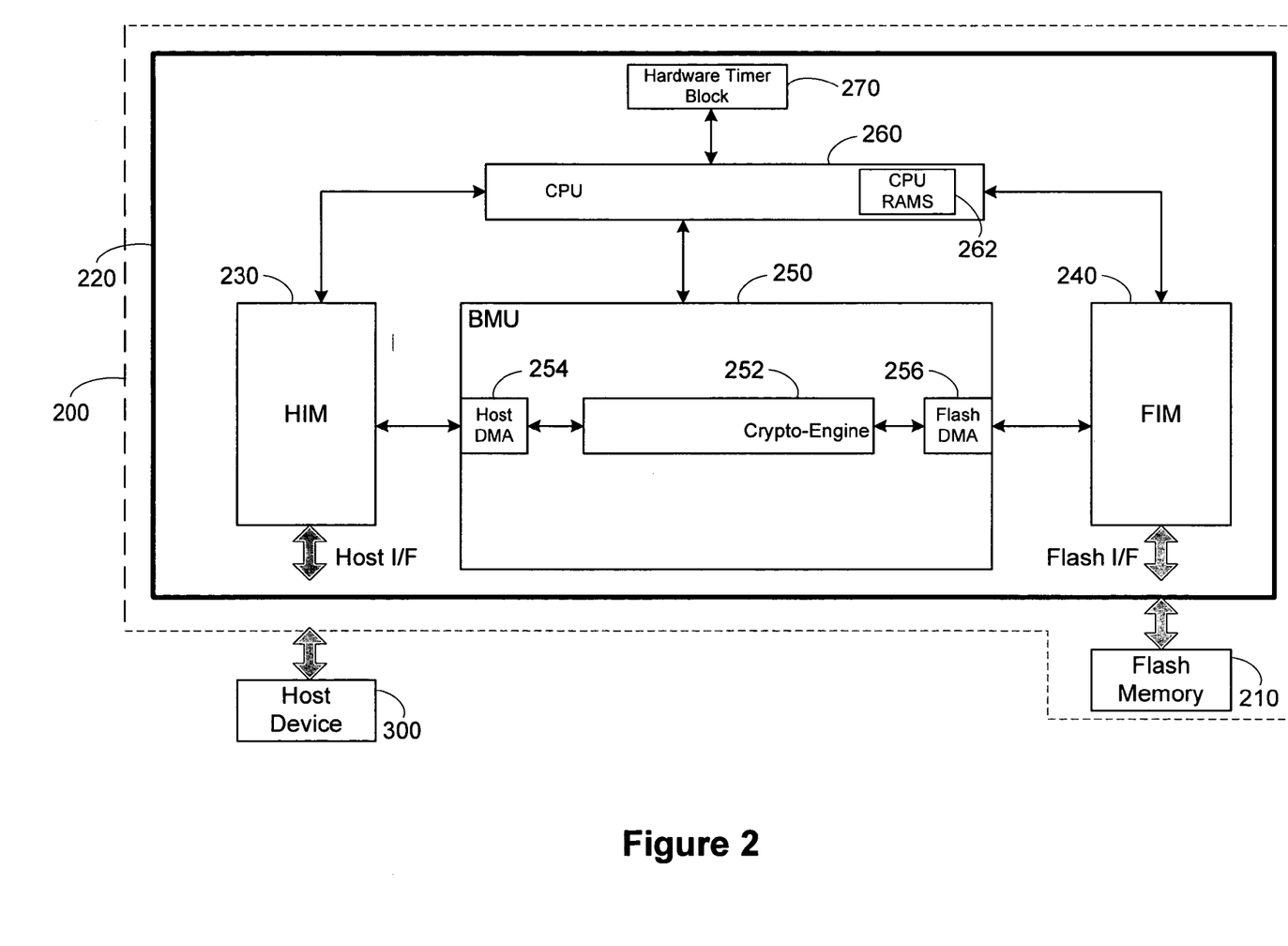
FIG. 2 is a block diagram of a memory device of an embodiment.

Turning again to the drawings, FIG. 2 is a block diagram of a memory device 200 of an embodiment, which can take the form of a memory card or stick. As shown in FIG. 2, the memory device 200 comprises a non-volatile memory array (such as flash memory) 210 and a collection of circuitry 220. In this embodiment, the non-volatile memory array 210 takes the form of a solid-state memory, in particular, flash memory 210. It should be noted that, instead of flash, other types of solid-state memories can be used. It should also be noted that memories other than solid-state memories can be used, such as, but not limited to, magnetic discs and optical CDs. Also, for simplicity, the term "circuitry" will be used herein to refer to a pure hardware implementation and/or a combined hardware/software (or firmware) implementation. Accordingly, "circuitry" can take the form of one or more of an application specific integrated circuit (ASIC), a programmable logic controller, an embedded microcontroller, and a single-board computer, as well as a processor and a computer-readable medium that stores computer-readable program code (e.g., software or firmware) executable by the processor.

The collection of circuitry 210 in FIG. 2 contains a plurality of components: a host interface module (HIM) 230, a flash interface module (FIM) 240, a buffer management unit (BMU) 250, a CPU 260, and a hardware timer block 270. The HIM 230 provides interface functionality for the host device 300, and the FIM 240 provides interface functionality for the flash memory 210. The BMU 250 comprises a crypto-engine 252 for providing encryption/decryption functionality and a host direct memory access (DMA) component 254 and a flash DMA component 256 for communicating with the HIM 230 and FIM 240, respectively. The CPU 260 executes software and firmware stored in the CPU RAMS 260 and/or the flash memory 210. The hardware timer block 270 will be described below in conjunction with the memory device's ability to measure time.

Other components of the memory device 200, such as the electrical and physical connectors for removably connecting the memory device 200 to a host device 300, are not shown in FIG. 2 to simplify the drawing. More information concerning the memory device 200 and its operation can be found in U.S. patent application Ser. Nos. 11/314,411 and 11/557,028, both of which are hereby incorporated by reference. Additional information can be found in U.S. patent application Ser. No. 11/322,812 and U.S. patent application Ser. No. 11/322,766, both of which are hereby incorporated by reference. It should be noted, however, that the components and functionality described in those documents should not be read into the following claims unless explicitly recited therein.

With an overview of the memory device 200 described, the memory device's 200 ability to measure time will now be discussed. In this embodiment, the memory device generates a time estimate based on measured active time with respect to a time stamp. In other words, a time stamp acts as a "start line," with the memory device's measured active time being added to the time stamp. A time stamp can take any form and indicate time to any desired degree of precision (e.g., year, month, day, hour, minute, second, etc.). Preferably, the memory device 200 is provided with a time stamp from an entity that the memory device 200 trusts to give it accurate time (e.g., the time server 100 or a trusted host device). A time stamp can take any form and be sent by itself or included in other information. The memory device preferably stores the time stamp securely, via the crypto-engine 252, so it cannot be easily tampered with.

Figure 3:
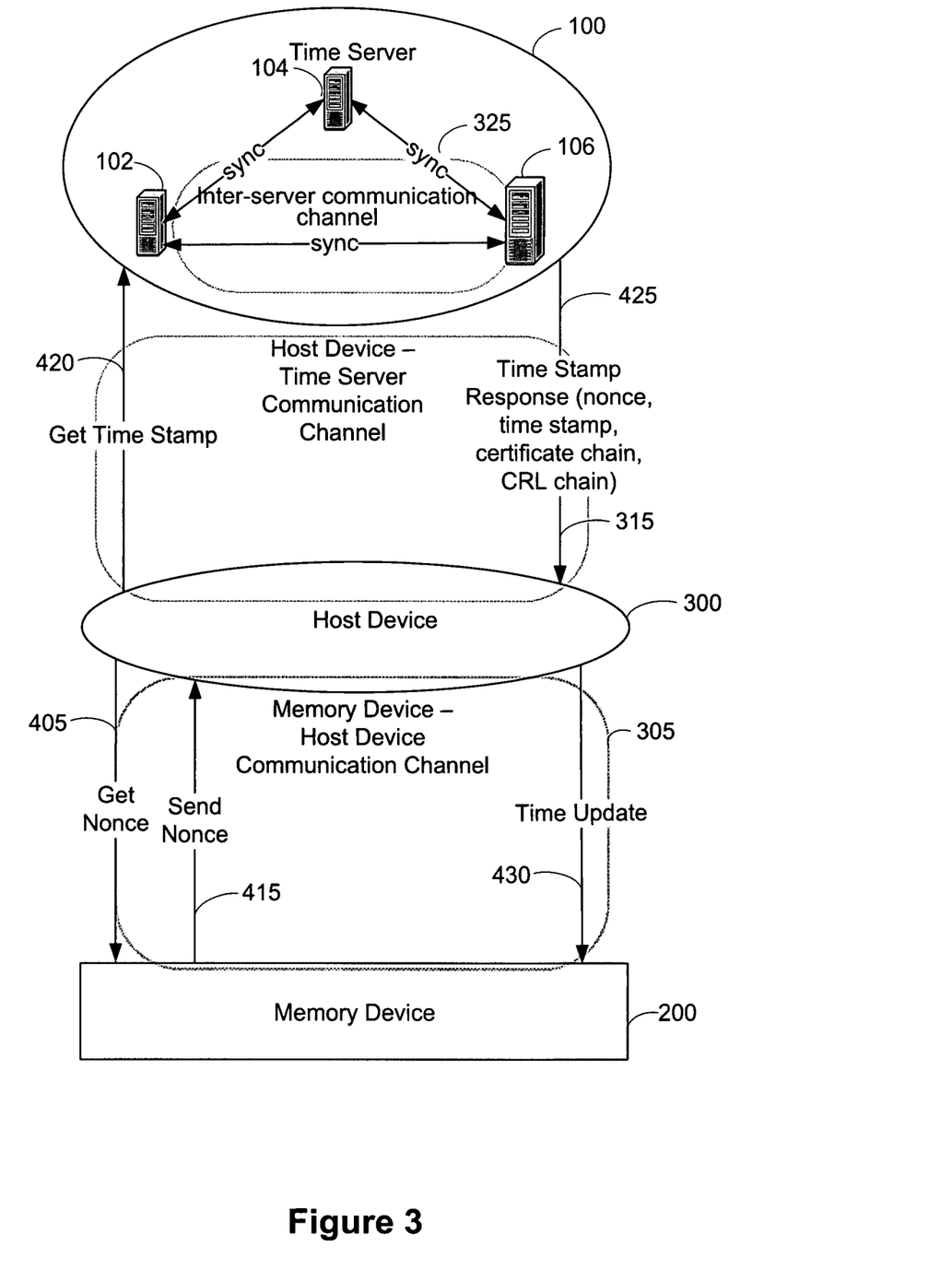
FIG. 3 is a system diagram of an embodiment for obtaining a time stamp.
Figure 4:
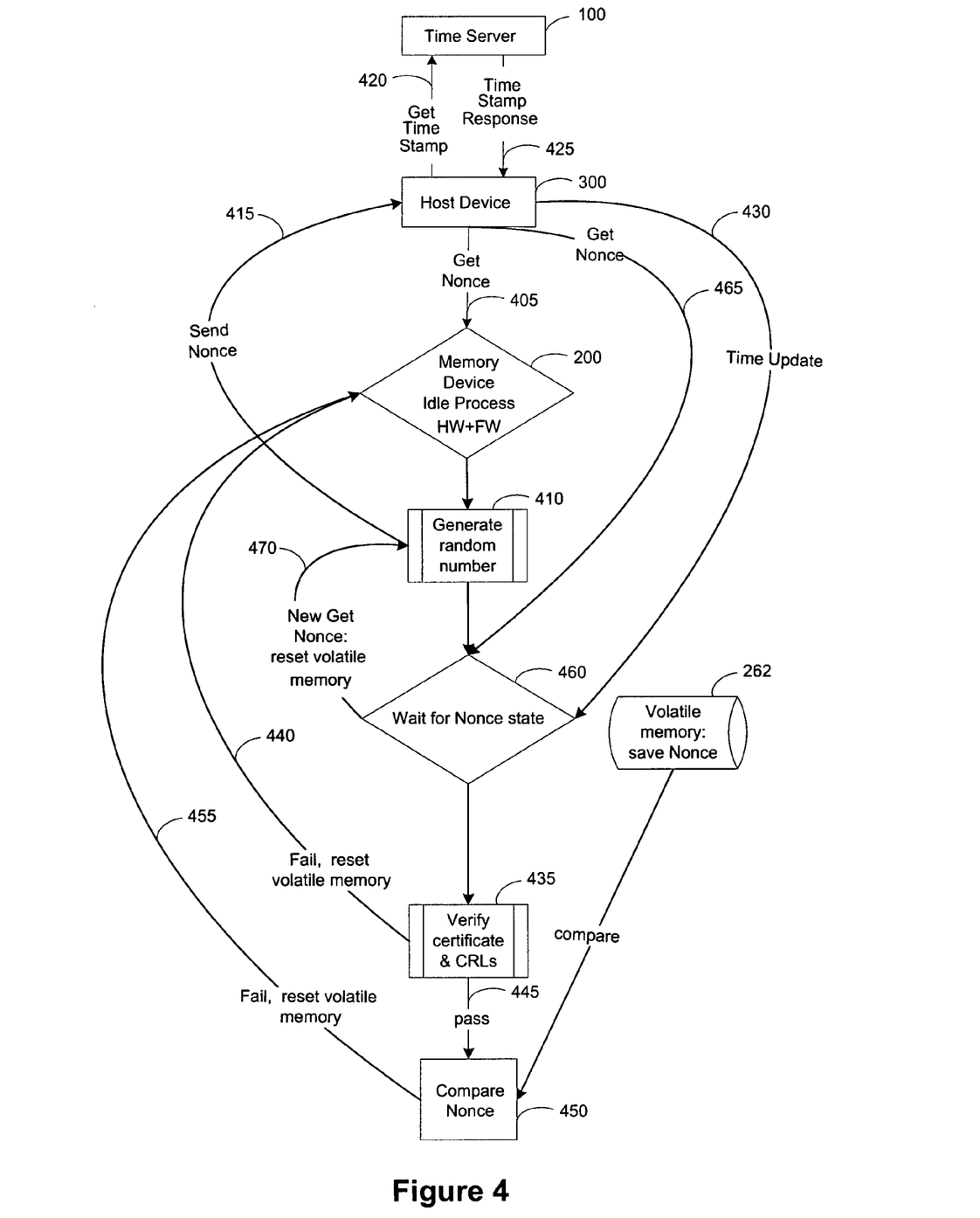
FIG. 4 is a flow chart of a method of an embodiment for obtaining a time stamp.

FIGS. 3 and 4 are a system diagram and a flowchart, respectively, that illustrate one particular way in which the memory device 200 can obtain a time stamp. It should be understood that the memory device 200 can obtain a time stamp in a different manner and that the time stamp can take different forms. It should also be understood that a single memory device interfacing with multiple servers or hosts may handle multiple forms simultaneously. Accordingly, the specifics of this example should not be read into the claims unless explicitly recited therein.

As shown in FIG. 3, the memory device 200 is in communication with the host device 300 via a memory device—host device communication channel 305, and the host device 300 is in communication with the time server 100 via a host device—time server communication channel 315. Although the time server 100 can comprise a single server, in this embodiment, the time server 100 comprises a plurality of servers 102, 104, 106 synced with each other via an inter-server communication channel 325.

In this embodiment, the procedure for requesting a time stamp is initiated by the host device 300, which sends a get nonce command to the memory device 200 (act 405) (see FIGS. 3 and 4). In this embodiment, a nonce is a 160-bit random number used by the memory device 200 to later verify the authenticity of the time stamp generated by the time server 100. The memory device 200 generates a random number (nonce) (act 410) and stores it in the CPU RAMS (i.e., volatile memory) 262 (or, alternatively, the memory 210) for a later verification step. The memory device 200 then sends the nonce to the host device 300 (act 415). The memory device 200 also starts to measure time (as described below) to later determine whether a time-out has occurred.

When the host device 300 receives the nonce, it sends a get time stamp request containing the nonce to the time server 100 (act 420). The time server 100 signs the time (e.g., world time in UTC Zulu format) and nonce with its private key. The time server 100 then sends a time stamp response, which, in this embodiment, comprises the nonce, the time stamp, a certificate chain, and a certificate revocation list ("CRL") chain, to the host device 300 (act 425). The host device 300 then sends a time update command with this response to the memory device 200 (act 430). In response to that command, the memory device 200 attempts to verify the certificate and CRLs (act 435). If the verification fails, the memory device 200 resets the volatile memory 262 and returns to an idle process (act 440). If the verification of the certificate and CRLs pass (act 445), the memory device 200 compares the nonce in the response with the nonce in the volatile memory 262 (act 450). If the comparison fails, the memory device resets the volatile memory 262 and returns to an idle process (act 455). If the comparison succeeds, the memory device 200 stores the new time stamp in the memory 210, preferably in a secure manner to protect against tampering.

It should be noted that, after the memory device 200 generates the nonce 410 and is waiting for a response (act 460), it is possible that the host device 300 can send the memory device 200 another get nonce command (act 465). As mentioned above, the memory device 200 starts to measure time after the nonce is generated. If the new nonce command (465) is received before the measured time reaches a certain time-out limit, the memory device 200 preferably ignores the new nonce command (465). However, if the new nonce command (465) is received after the time-out limit, the memory device 200 will reset the volatile memory 262 and generate a new nonce (act 470). Accordingly, the nonce is only valid for a limited time, and the time-out limit (the "travel time error") is the maximum time that the memory device 200 considers legitimate to wait for a time stamp from the time server 100.

Because the time stamp stored in the memory device 200 contains the time that the time server 100 signed the data string, the time indicated in the time stamp may not be the actual, real world time that the host device 300 requested the time stamp or the actual, real world time that the memory device 200 stored the time stamp, depending on the degree of precision of the time stamp (e.g., year, month, day, hour, minute, second, etc.) and the delays involved in sending the request and receiving the response. The nonce time-out period discussed above can be set to such a time to ensure that the time stamp will have the degree of precision required by the memory device 200. Accordingly, the memory device 200 has control over the maximum acceptable delay in a time stamp request. Also, in alternate embodiments, the time stamp generated by the time server 100 can indicate some other time, such as an estimated time that the host device 300 requested the time stamp, the expected time the time stamp will be stored in the memory device 200, or some other time.

The above protocol allows the memory device 200 to communicate with the time server 100 over an unsecured connectivity system (e.g., the Internet, a WiFi network, a GSM network, etc.). The connectivity system is unsecured in the sense that the memory device 200 cannot assume that the time stamp sent by the time server 100 will not be tampered with during transmission. Since the network cannot be relied upon to protect the time stamp, the above protection mechanism (or some other protection mechanism) can be used between the time server 100 and the memory device 200. The encryption protocol is such that, if the time stamp is tampered with, the memory device 200 can detect it. In other words, because the connectivity system is not secure, the system itself cannot prevent people from changing the bits in the time stamp; however, the memory device 200 can detect the tampering and reject the time stamp. In an alternate embodiment, a secured communication system is used (i.e., the data communication lines are protected), and the time stamp can simply be sent as plain text since no one can tamper with the time stamp.

Now that the receipt of the time stamp has been explained, the memory card's ability to track time will be discussed. As mentioned above, the memory device 200 has limited time tracking capabilities; specifically, the memory device 200 is able to measure its active time. Active time can refer to the amount of time that the memory device 200 was connected to a host device and actually used (i.e., when there is activity on the bus between the memory device 200 and host device 300, as compared to being idle or in a sleep mode). Alternatively, active time can refer to the entire amount of time that the memory device 200 was connected to and received power from the host device 300. The terms "active time" and "usage time" will be used interchangeably herein. As described below, in this embodiment, the memory device 200 is active when the hardware timer block 270 can generate clock ticks as interrupts to the CPU 260, and the CPU 260 can increment the active time counter.

In operation, the hardware timer block 270 (e.g., an ASIC controller) contains an oscillator that generates periodic clock ticks and provides such ticks to the CPU 260 as interrupts. (Preferably, the oscillator operates at a very low frequency and runs while the CPU 260 is asleep.) Accordingly, the hardware timer block 270 interrupts the CPU 260 on a periodic basis (e.g., every millisecond or microsecond). When the CPU 260 gets the interrupt, a special clock interrupt service routine (e.g., in firmware run by the CPU 260) is invoked and adds one period/unit to an active time counter, which is stored in the CPU RAMS 262 and also in the non-volatile, flash memory 210, so the counter value won't be lost in case of power loss. To avoid excessive wear to the memory 210, it is preferred that the active time counter in the memory 210 be updated periodically (e.g., every minute or so, as long as the memory device 200 is powered on) instead of in response to every clock tick. Although this can lead to additional inaccuracies in the measured time if power loss occurs before the active time counter is updated, this sacrifice might be deemed acceptable in view of the benefits to memory endurance. (To further protect memory endurance, the value stored to the active time counter can include a field indicating how many times the counter has been written to. If the write value exceeds a certain amount, the counter can be stored in another location in memory. The bits within the counter can also be shifted, if that helps endurance.) It is also preferred that writing to the active time counter not affect performance (aside from power consumption to perform the write) and regular activity of the memory device 200. For example, the writing to the active time counter can be treated as a background task and performed before servicing a host device command. At the end of the host device command, firmware in the memory device 200 can verify that programming of the active time counter succeeded by reading the data out of the memory and comparing it to the desired value.

Also, it is preferred that the value of the active time counter be stored in the memory 210 securely (e.g., signed via the crypto-engine 252 using a key-hashed message authentication code (HMAC)), so it cannot be easily tampered with. In case of a signature mismatch, the data can be treated as un-initialized, as if an attacker tampered with it. Further, it should be noted that other mechanisms for measuring active time can be used.

To convert the stored value in the active time counter into real time, the CPU 260 multiplies the stored value by the frequency in which the hardware timer block 270 generates clock ticks. For example, if the value 500 were stored in the active time counter and the hardware timer block 270 generates a clock tick every 5 milliseconds, the CPU 260 would calculate an active time of 2,500 milliseconds (500 times 5). To generate a time estimate, the translated active time is added to the last time stamp. When a new time stamp is received by the memory device 200, the new time stamp is stored in the memory device 200, and the active time counter is reset. Thus, active time will thereafter be measured with respect to the new time stamp instead of the old time stamp. Instead of resetting (and, therefore, "rolling back") the counter, the active time counter value that exists at the time of the new time stamp can be recorded and subtracted from the current time in order to measure the active time.

Unfortunately, a time estimate generated from the measured active time will not be a true measure of the actual time if the memory device 200 does not continuously measure active time. Thus, if the memory device 200 is "inactive" (e.g., when the memory device 200 is idle or in sleep mode, or when the memory device 200 is powered-down or when the memory device 200 is removed from the host device 300—in this embodiment, whatever event causes the hardware timer block 270 to stop generating clock ticks and/or causes the CPU 260 to stop reacting to such ticks), the measured active time will be less than the actual time that passed since the measurement started because there is nothing in the memory device 200 to tell it that time is passing when it is inactive.

For example, let's say that a time stamp was received on January 1, and the memory device 200 measured an active time of two days. (For simplicity, time is measured in units of days in this example. However, as mentioned above, any desired unit of time can be used.) Accordingly, a time estimate generated by the memory device 200 at this point would indicate that the date is January 3 (i.e., by adding the active time of two days to the last time stamp of January 1). If the memory device 200 continuously measured active time, this time estimate would accurately represent the actual time (assuming the hardware timer block 270 and CPU 260 are functioning accurately). However, if the memory device 200 did not continuously measure active time (i.e., if the memory device 200 was inactive at any point after it started measuring the active time), the time estimate would not accurately represent the actual time. At best, the time estimate would indicate that the actual time was at least January 3. The actual time could be January 4 or some later time (June 29, November 2, December 5, the next year, etc.).

If time restrictions were based on active time, this would not pose a problem. Unfortunately, time restrictions (e.g., for authentication or DRM usage) are usually built on real-world calendar time—not active time of the memory device 200. Even so, this inaccuracy would not necessarily be a problem in this example if the time restriction for a particular application was before January $3^{rd}$. That is, if access to a song expires on January 2, and the time estimate from the memory device 200 is January 3, access to the song would be prohibited irrespective of whether the time estimate is accurate (i.e., whether it really is January 3) or whether the time estimate is inaccurate (i.e., whether it is some time after January 3). However, if the time restriction were January 4 (or later), the inaccuracy would lead to a question—is it really January 3

(and, therefore, access should be granted) or is it really later than January 3 (and, therefore, access should be denied).

Figure 5:
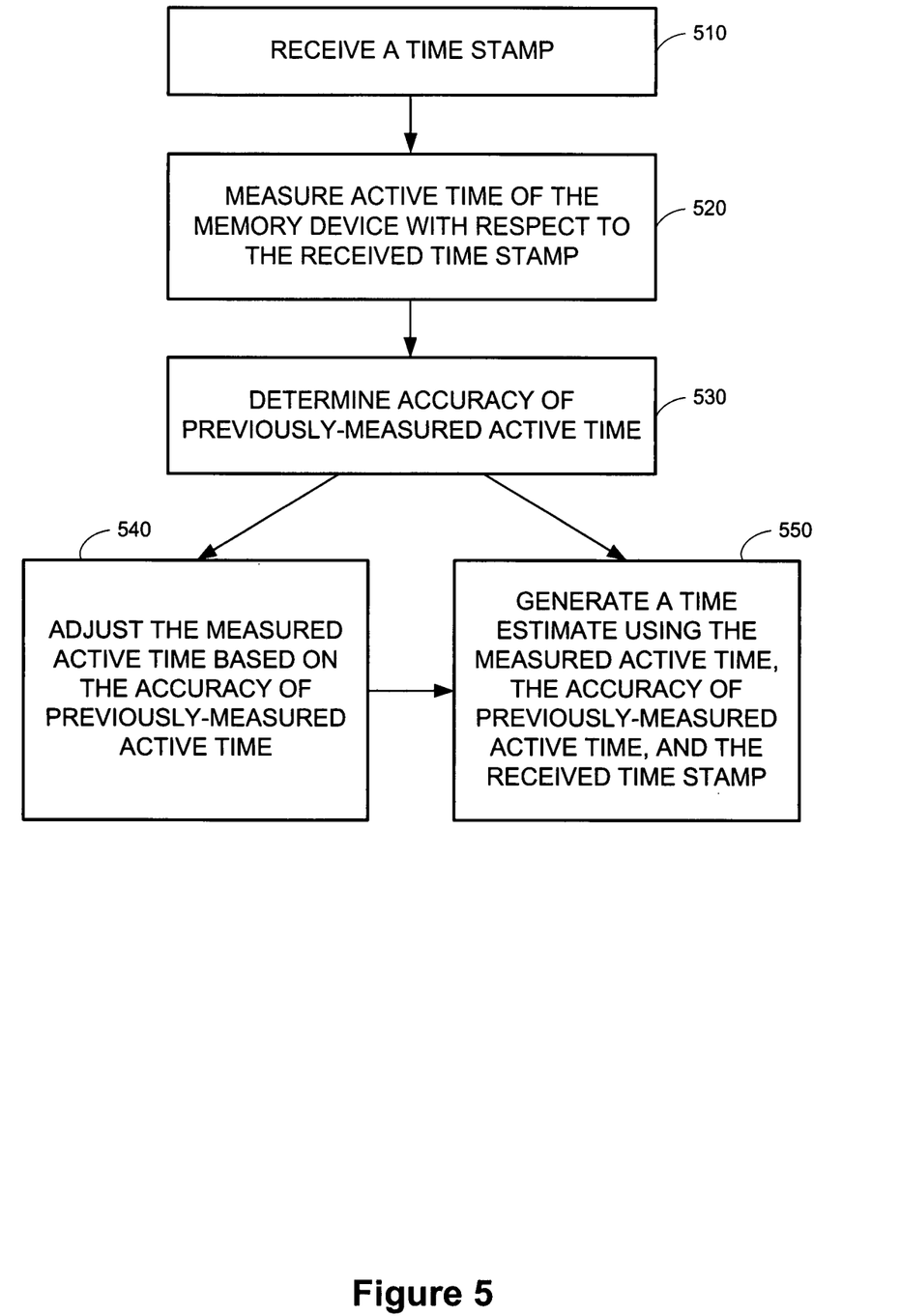
FIG. 5 is a flow chart of a method of an embodiment for improving accuracy of a time estimate from a memory device.

To address this issue, this embodiment provides a method for improving the accuracy of a time estimate from the memory device 200. This method will be illustrated in conjunction with the flow chart of FIG. 5. As shown in FIG. 5, a time stamp is received (act 510), and the active time of the memory device 200 is measured with respect to the received time stamp (act 520). These acts have been previously described. However, to improve the accuracy of the time estimate, in this method, the memory device 200 (e.g., using the CPU 260) determines the accuracy of previously-measured active time (act 530). (Although act 530 is shown after acts 510 and 520 in the flowchart, act 530 can be performed at any time.) This act will be illustrated with reference to the timelines in FIGS. 6-7.

Figure 6:
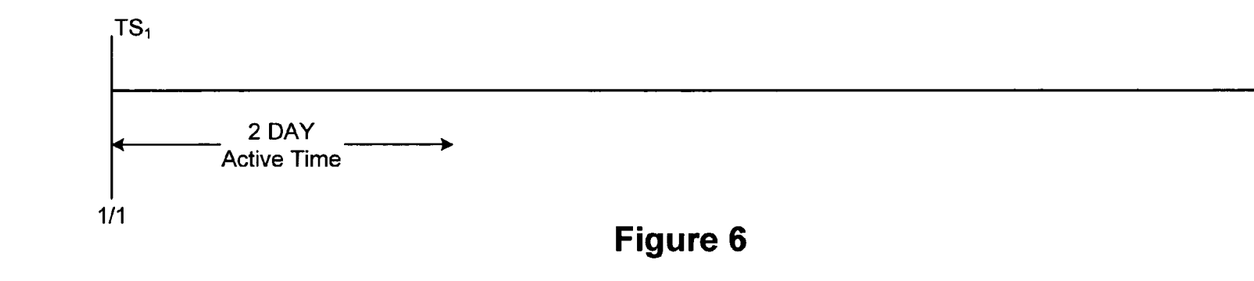
FIGS. 6-8 are timelines used to illustrate an embodiment.

FIG. 6 shows a timeline for the above example where a time stamp ($TS_1$) was received on January 1, and the memory device 200 measured an active time of two days. As discussed above, a time estimate generated from this measured active time would indicate that it was at least January 3. However, when the next time stamp ($TS_2$) is received (see FIG. 7), the memory device 200 will know that actual time that has elapsed since the previous time stamp, since the actual time is the difference between the two time stamps (i.e., actual time=$TS_2-TS_1$). The second time stamp also allows the memory device 200 to calculate its "down time" (down time=actual time−active time). In this example, the down time is also two days. Since the memory device 200 knows the actual time between time stamps (four days), the measured active time (two days), and the calculated down time (two days), the memory device 200 can determine how accurately the measured active time represented the actual time between these time stamps. For example, the memory device 200 can compare the measured active time with the actual time, compare the calculated down time by the actual time, compare the measured active time with the calculated down time, etc. As seen by these examples, the accuracy of previously-measured active time can be determined without directly using the previously-measured active time in the calculation, as when the accuracy is determined by comparing down time (which is calculated from measured active time) and actual time. In this illustration, the accuracy of the measured active time to the actual time is 50%. As noted above, although the accuracy of previously-measured active time is determined in this embodiment by a comparison of the measured active time to the actual time between two time stamps, other methods of determining accuracy can be used.

Figure 8:
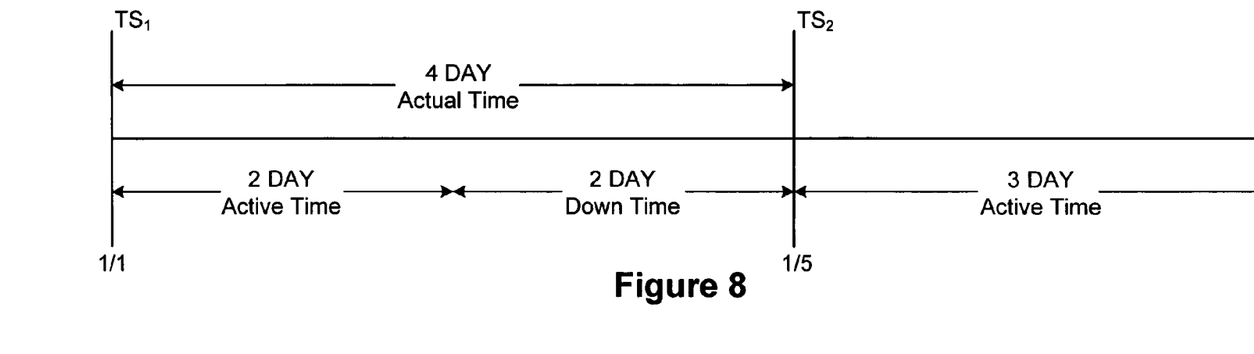

With this accuracy information, the memory device 200 can adjust the measured active time (act 540). For example, FIG. 8 shows that the memory device 200 measures three days of active time since the last time stamp ($TS_2$). (As mentioned above, the active time counter is preferably reset when a new time stamp (here, $TS_2$) is received.) The memory device 200 knows that the last time it measured active time, it produced a value that was 50% of the actual time. So, this time, instead of using the measured active time, the memory device 200 can adjust (or "stretch") the measured active time based on its knowledge of its prior accuracy. In this way, the measured active time of three days would be adjusted (or "stretched") by a factor of two (because the measured active time was 50% of the actual time) to yield six days.

The adjusting (or "stretching") of measured active time can be performed in any suitable manner. In one embodiment, this "stretching" is performed by changing the multiplier that the CPU 260 uses to translate the value in the active time counter. (While the original multiplier can be replaced, it is preferred that both the new and old multipliers be stored.) As discussed above, in the "un-stretched" case, the CPU 260 multiplies the value in the active time counter by the frequency in which the hardware timer block 270 generates a clock tick. For example, if the hardware timer block 270 generates a clock tick every 5 milliseconds and the active time counter stores a value of 500, the CPU 260 would generate a time value of 2,500 milliseconds (i.e., 500 times 5). If the previous time estimates were off by a factor of two (i.e., the "stretch factor"), the CPU 260 would double the value of the multiplier (i.e., one clock tick represents 10 milliseconds instead of 5 milliseconds) to yield a "stretched" time value of 5,000 milliseconds. Alternatively, instead of altering the multiplier value, the original multiplier value can be used, and the product of the multiplication of the multiplier and the value in the active time counter can be "stretched" by the "stretch" factor. Of course, any other desired mechanism to adjust the measured active time based on the accuracy of previously-measured active time can be used.

Figure 7:
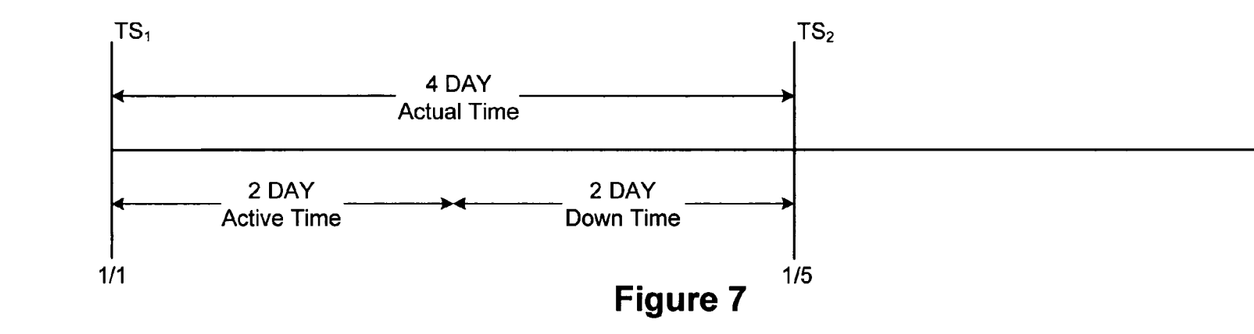

It should be noted that while the illustrations in FIGS. 6-8 show the determination of accuracy of previously-measured active time being based on only one prior accuracy measurement, it is preferred that the determination of accuracy of previously-measured active time be based on a plurality of prior accuracy measurements. In one embodiment, a running average of prior accuracy measurements is taken and stored in the memory 210 as the "stretch" factor. Alternatively, instead of storing a single "stretch" factor representing a running average of previously determined "stretch" factors, the memory device 200 can store a historical record of all prior stretch factors (or all prior active and actual times (or down times, etc.)) and calculate the average on the fly. However, it may be preferred to store a single "stretch" factor since storing a historical record would consume more memory. Regardless of what methodology is used, it should be clear that the more frequent the time stamp updates, the more accurately stretched active time will represent actual time (because more accuracy data will be collected). Conversely, the less frequent the time stamp updates, the less accurately stretched active time will represent actual time. Further, even when time stretching is not used, frequent time updates can increase the accuracy of the measured active time since the active time counter is reset (and, thus, so too are any inaccuracies in that measured active time) when a new time stamp is received. Even if the memory device 200 contains a built-in battery-backed-up clock, frequent time stamp updates can improve the accuracy of such a clock, as a clock can drift over time.

While the above examples took a simple average of the "stretch" factors (i.e., the determined accuracies between time stamps), in other embodiments, a weighted average (or some other function) can be used. In yet another embodiment, just one stretch factor can be used. Accordingly, an "average" should not be read into the claims unless explicitly recited therein. When an average is used, the data can be taken of each preceding time stamp pair or on some subset. That is, certain time stamp pairs can be skipped or discarded in the accuracy determination (e.g., because power cycle information indicates that the active time for a certain period is very inaccurate, as described below). Also, the standard deviation of the "stretch" factors can be calculated to determine if the measured active time should be adjusted. For example, if the "stretch" factors are converging to the same number, the "stretch" factors can be considered to be meaningful, and the memory device 200 can adjust the measured active time based on an average of the "stretch" factors. On the other hand, if the standard deviation of the "stretch" factors is greater than some threshold amount, the memory device 200 can decide that the average of the "stretch" factors is not reliable and not adjust the measured active time, in which case only the measured, "un-stretched" active time would be used.

As mentioned above, the acts in the method can be performed in any suitable manner. For example, the accuracy determination of prior active time measurements can be made before or after the most recent time stamp is received and/or the current active time is being measured. Also, the time stamp of a current time measurement can be, but does not have to be, used to determine the accuracy of previously-measured active time (i.e., the time stamp received in act 510 can be, but does not have to be, one of the time stamps used to calculate the actual time that the previously-measured active time is compared against in act 530). Additionally, in the above embodiments, it was assumed that the memory device 200 accurately measures active time (i.e., that the hardware timer block 270 reliably generates interrupts at the given frequency). If inaccuracies exist, they can be accounted for using, for example, a variation of the technique described above. "Time stretching" can even be used if the time generated by the host device can be trusted or if the memory device has its own battery-backed-up clock (e.g., if the clock in the host device or memory card becomes inaccurate over time).

In some situations, knowing the adjusted active time is sufficient, such as when the active time is a factor in a time-update policy, However, in other situations, such as when validated a DRM license or authenticating a certificate that expires at a real-world date and time, a time estimate needs to be generated. To improve the accuracy of a time estimate, the time estimate can be generated using the measured active time, the accuracy of the previously-measured active time, and the received time stamp (act 550 in FIG. 5). Such a time estimate can be generated in any suitable way. For example, a time estimate can be generated using stretched active time. Returning to the example shown in FIG. 8, the measured active time is three days. Instead of generating a time estimate of January 8 (i.e., January 5 plus three days, as measured by active time), the measured active time can be adjusted to six days (based on the 50% accuracy of the previously-measured active time), and the adjusted measured active time can be added to the time stamp to generate a time estimate of January 11 (i.e., January 5 plus six days of "stretched" active time). Alternatively, instead of generating a time estimate using "stretched" active time, a time estimate can be generated by using the measured active time, and that time estimate can be "stretched" by the "stretch" factor. In either alternative (and others), the time estimate is generated using the measured active time, the accuracy of the previously-measured active time, and the received time stamp. Accordingly, that phrase should not be read as requiring "stretched" active time or any other particular implementation.

There are certain situations in which it may be desirable to obtain a new time stamp or use "un-stretched" active time rather than "stretch" active time. One example, which was described above, is when the standard deviation of the "stretch" factors exceeds a certain threshold. As another example, if the measured active time exceeds a certain threshold and, therefore, is not being used within an expected usage pattern, using the "stretch" factor may result in excessive "under stretching" over "over stretching." In such a situation, it may be desired to obtain a new time stamp or use the "un-stretched" active time. The number of power cycles of the memory device 100 since the last time stamp is another indication that the memory device 100 is being used outside of an expected usage pattern. The number of power cycles is a count of how many times the memory device 200 was powered up, which indicates how many times the memory device 200 was powered down (i.e., for every power up, there must have been a power down). The number of power cycles can be measured by the CPU 260. Every time the memory device 200 goes through a power cycle, the CPU 260 can invoke a device reset routine in firmware. As in the situation where the CPU 260 adds one unit to an active time counter, with the device reset routine, the CPU 260 would add one unit to a power cycle counter in the CPU RAMS 262 and/or memory 210. As with the active time counter, the power cycle counter can be updated periodically to reduce memory wear.

When the memory device 200 is powered down, there is at least some actual time that is not represented by the active time. Because the memory device 200 does not know how much time passed between power cycles, the number of power cycles does not provide time information. However, it does provide a sense of the usage patterns of the memory device 200, which can roughly indicate how inaccurate the measured active time might be. For example, a time estimate made when the memory device 200 had 10 power cycles since the last time stamp may be less accurate than a time estimate made when the memory device 200 had only a single power cycle since the last time stamp. Also, in certain embodiments, the memory device 200 may be powered up in an idle/sleep mode and, therefore, not measuring active time. Keeping track of the number of power cycles provides information on this inaccuracy that may not otherwise have been detected. For all of these reasons, the number of power cycles may indicate how inaccurate the active time is.

The memory device 200 can be designed to take the number of power cycles into account in a time estimation. Specifically, if the number of power cycles exceeds some threshold number, the memory device 200 may demand a new time stamp rather than generating a time estimate based on the measured active time (with or without using "time stretching"). For example, if the time operation is very sensitive and an assurance is needed that the expiration date has not passed, the threshold number can be set to one. Accordingly, if the memory device 200 were shut down even once (and, hence, there is at least some amount of time that cannot be accounted for by the measured active time), the memory device 200 would not rely upon the measured active time to generate a time estimate but would, instead, request a new time stamp. In this way, the number of power cycles, which is an indication of the inaccuracy of the measured active time, is used to force a time sync with the time server 100. In contrast, if the number of power cycles since the last time stamp is zero, a time estimate based on the measured active time would be accurate, and a new time stamp would not be needed. In such a situation, the measured active time can be multiplied by the original multiplier (the frequency in which the hardware timer block 270 generates clock ticks) instead of the averaged "stretch" factor, for example. In this way, determining the number of power cycles is a threshold step to determining whether or not to use "time stretching." If, on the other hand, the time operation was not as sensitive and "stretching" the active time was deemed sufficient to account for the time lost during down times, the number of power cycles can be set at a higher number or not even considered at all. If the number of power cycles is lower than the threshold value (but, as discussed above, perhaps not if zero), the memory device 200 performs the "time stretching" operation. If the number of power cycles is greater than or equal to the threshold value, the memory device 200 would request a new time stamp and not perform the "time stretching" operation.

The number of power cycles can also be used in the "stretching" operation. Instead of or in addition to determining a "stretch" factor, the memory device 200 can determine the "stretch"-factor-per-power-cycle. As time passes, the amount of time that the memory device 200 is not counting increases. Therefore, inaccuracy is increasing over time. The use of a "stretch"-factor-per-power-cycle can be used to address this inaccuracy trend. For example, if it is determined that the average "stretch" factor is 50%, and there were, on average, ten power cycles between time stamps, there would be a 5% "stretch"-factor-per-power-cycle. Accordingly, when active time needs to be "stretched" during a period in which there were five power cycles, the active time would be "stretched" by 25% (5% times five) instead of 50%. Giving weight to the power cycles in the manner can help improve the accuracy of "stretched" time. (The use of a "stretch"-factor-per-power-cycle still comes under the umbrella of adjusting measured active time (or generating a time estimate) based on the accuracy of the previously-measured active time, since the accuracy of the previously-measured active time is used to calculate a "stretch"-factor-per-power-cycle.)

The number of power cycles can also be used to protect the endurance of the memory 210. To avoid the situation in which the active time counter is "worn out," a rate-scaling algorithm can be used to adapt the frequency of the writes to the active time counter based on the usage model of the memory device 200, as indicated by the number of power cycles. For example, there can be four rates for recording the active time (e.g., every two minutes, every four minutes, every eight minutes, and every 16 minutes), one of which is chosen based on the number of power cycles since the last time stamp.

Because the time stamp, measured active time, calculated down time, number of power cycles, and/or "stretch" factor can be used to generate a time estimate, it is preferred that these values be stored in a secure manner in the memory device 200 to prevent someone from tampering with these values. For example, the crypto-engine 252 can be used to sign these values in an encrypted form before storage in the memory array 210 (e.g., using a key-hashed message authentication code (HMAC)). In case of a signature mismatch, the data can be treated as un-initialized, as if an attacker tampered with it.

It should be noted that these embodiments can be used in any suitable application. Examples of such applications include, but are not limited to, authentication, a host revocation operation (e.g., validating a host's CRLs), DRM license validation, and other applications internal to the memory device 200. Further, while it is presently preferred that these embodiments be implemented in a TrustedFlash™ memory device by SanDisk Corporation, it should be understood that these embodiments can be used in any type of memory device. Further, these "time stretching" embodiments can be used in non-memory device fields where one encounters the general problem of having an inaccurate clock and needing to know the time. Additionally, some or all of the acts described above can be performed on a host device (or some other device) instead of exclusively on the memory device.

It is intended that the foregoing detailed description be understood as an illustration of selected forms that the invention can take and not as a definition of the invention. It is only the following claims, including all equivalents, that are intended to define the scope of this invention. It should be noted that the acts recited in the claims can be performed in any order—not necessarily in the order in which they are recited. Finally, it should be noted that any aspect of any of the preferred embodiments described herein can be used alone or in combination with one another.

What is claimed is:

1. A method for improving accuracy of a time estimate in a memory device, the method comprising:
    performing the following in a memory device:
        determining accuracy of previously-measured active time by comparing the previously-measured active time with an actual time from a first time stamp obtained by the memory device from a trusted time server through a host, which is untrusted;
        measuring active time of the memory device relative to a second time stamp obtained by the memory device from the trusted time server through the host, wherein the measuring is performed internally in the memory device when the memory device is active, the memory device being active when it is connected to and receives power from the host;
        adjusting the measured active time based on the determined accuracy;
        generating a time estimate by applying the adjusted measured active time to the second time stamp; and
        using the generated time estimate for a time-based operation.

2. The method of claim 1 further comprising:
    measuring a number of power cycles with respect to the second time stamp; and
    if the number of power cycles exceeds a threshold, requesting a new time stamp instead of generating the time estimate.

3. The method of claim 1 further comprising:
    measuring a number of power cycles with respect to the second time stamp; and
    if the number of power cycles equals zero, generating a time estimate by adding the measured active time to the second time stamp instead of using the adjusted measured active time.

4. The method of claim 1 further comprising:
    if the measured active time exceeds a threshold, requesting a new time stamp instead of generating the time estimate.

5. The method of claim 1, wherein determining accuracy of active time previously measured by the memory device comprises determining a plurality of stretch factors, and wherein the method further comprises:
    measuring a standard deviation of the plurality of stretch factors; and
    if the standard deviation of the plurality of stretch factors exceeds a threshold, performing one of the following:
        requesting a new time stamp instead of generating the time estimate; and
        generating a time estimate by adding the measured active time to the second time stamp instead of using the adjusted measured active time.

6. The method of claim 1, wherein determining accuracy of active time previously measured by the memory device comprises determining a plurality of stretch factors and calculating a running average of the plurality of stretch factors.

7. The method of claim 1, wherein determining accuracy of active time previously measured by the memory device comprises comparing active time previously measured by the memory device with actual time between two discrete time stamps.

8. The method of claim 1, wherein determining accuracy of active time previously measured by the memory device comprises comparing down time with actual time between two discrete time stamps.

9. The method of claim 1, wherein determining accuracy of active time previously measured by the memory device comprises comparing active time previously measured by the memory device with down time.

10. The method of claim 1, wherein determining accuracy of active time previously measured by the memory device comprises determining a stretch factor per power cycle of the memory device, wherein the method further comprises measuring a number of power cycles with respect to the second time stamp, and wherein the time estimate is generated based on the stretch factor per power cycle and the number of power cycles.

11. The method of claim 1, wherein active time is measured by incrementing a value in a time counter in response to an interrupt signal, and wherein the measured active time is adjusted by multiplying the value in the time counter by an amount based on the accuracy of active time previously measured by the memory device instead of by a frequency at which the interrupt signal is generated.

12. The method of claim 1, wherein active time is measured by incrementing a value in a time counter in response to an interrupt signal and multiplying the value in the time counter by a frequency at which the interrupt signal is generated, and wherein the measured active time is adjusted by multiplying the measured active time by an amount based on the accuracy of active time previously measured by the memory device.

13. The method of claim 1, wherein at least one of the first and second time stamps is signed by the time server.

14. The method of claim 1, wherein the memory device stores digital rights management (DRM) keys and licenses to unlock protected content stored on the memory device.

15. The method of claim 1 further comprising using the time estimate in one or more of the following operations: an authentication operation, a host revocation operation, and a digital rights management (DRM) operation.

16. A method for improving accuracy of measured active time in a memory device, the method comprising:
performing the following in a memory device:
determining accuracy of previously-measured active time by comparing the previously-measured active time with an actual time from a first time stamp obtained by the memory device from a trusted time server through a host, which is untrusted;
measuring active time of the memory device relative to a second time stamp obtained by the memory device, wherein the measuring is performed internally in the memory device when the memory device is active, the memory device being active when it is connected to and receives power from the host;
adjusting the measured active time based on the determined accuracy; and
using the adjusted measured active time for a time-based operation.

17. The method of claim 16 further comprising:
generating a time estimate using the adjusted measured active time.

18. The method of claim 16 further comprising:
measuring a number of power cycles with respect to the second time stamp; and
if the number of power cycles exceeds a threshold, requesting a new time stamp instead of adjusting the measured active time.

19. The method of claim 16 further comprising:
measuring a number of power cycles with respect to the second time stamp;
wherein the measured active time is not adjusted if the number of power cycles equals zero.

20. The method of claim 16, wherein the measured active time is not adjusted if the measured active time exceeds a threshold.

21. The method of claim 16, wherein determining accuracy of active time previously measured by the memory device comprises determining a plurality of stretch factors, and wherein the method further comprises:
measuring a standard deviation of the plurality of stretch factors; and
performing one of the following:
adjusting the measured active time only if the standard deviation of the plurality of stretch factors does not exceed a threshold; and
requesting a new time stamp instead of adjusting the measured active time if the standard deviation of the plurality of stretch factors exceeds a threshold.

22. The method of claim 16, wherein determining accuracy of active time previously measured by the memory device comprises determining a plurality of stretch factors and calculating a running average of the plurality of stretch factors.

23. The method of claim 16, wherein determining accuracy of active time previously measured by the memory device comprises comparing active time previously measured by the memory device with actual time between two discrete time stamps.

24. The method of claim 16, wherein determining accuracy of active time previously measured by the memory device comprises comparing down time with actual time between two discrete time stamps.

25. The method of claim 16, wherein determining accuracy of active time previously measured by the memory device comprises comparing active time previously measured by the memory device with down time.

26. The method of claim 16, wherein determining accuracy of active time previously measured by the memory device comprises determining a stretch factor per power cycle of the memory device, wherein the method further comprises measuring a number of power cycles with respect to a received time stamp, and wherein measured active time is adjusted using the stretch factor per power cycle and the number of power cycles.

27. The method of claim 16, wherein active time is measured by incrementing a value in a time counter in response to an interrupt signal, and wherein the measured active time is adjusted by multiplying the value in the time counter by an amount based on the accuracy of active time previously measured by the memory device instead of by a frequency at which the interrupt signal is generated.

28. The method of claim 16, wherein active time is measured by incrementing a value in a time counter in response to an interrupt signal and multiplying the value in the time counter by a frequency at which the interrupt signal is generated, and wherein the measured active time is adjusted by multiplying the measured active time by an amount based on the accuracy of active time previously measured by the memory device.

29. The method of claim 16 further comprising receiving the first time stamp.

30. The method of claim 29, wherein at least one of the first and second time stamps is signed by the time server.

31. The method of claim 16, wherein the memory device stores digital rights management (DRM) keys and licenses to unlock protected content stored on the memory device.

32. The method of claim 16 further comprising using the adjusted measured time in one or more of the following operations: an authentication operation, a host revocation operation, and a digital rights management (DRM) operation.

33. A memory device comprising:
a memory array; and
circuitry in communication with the memory array and operative to:
measure active time of the memory device, only when the memory device is active, wherein the memory device is active when it is connected to and receives power from a host;
determine accuracy of active time previously measured by the memory device over a time period by comparing it with actual time over that time period, wherein accuracy is determined by comparing active time previously measured by the memory device with actual time between two discrete time stamps obtained by the memory device from a trusted time server through the host, which is untrusted;
adjust the measured active time based on the determined accuracy; and
use the adjusted measured active time for a time-based operation.

34. The memory device of claim 33, wherein the circuitry is further operative to:
generate a time estimate using the adjusted measured active time.

35. The memory device of claim 33, wherein the circuitry is further operative to:
measure a number of power cycles with respect to a received time stamp; and
if the number of power cycles exceeds a threshold, request a new time stamp instead of adjusting the measured active time.

36. The memory device of claim 33, wherein the circuitry is further operative to:
measure a number of power cycles with respect to a received time stamp;
wherein the measured active time is not adjusted if the number of power cycles equals zero.

37. The memory device of claim 33, wherein the measured active time is not adjusted if the measured active time exceeds a threshold.

38. The memory device of claim 33, wherein determining accuracy of active time previously measured by the memory device comprises determining a plurality of stretch factors, and wherein the circuitry is further operative to:
measure a standard deviation of the plurality of stretch factors; and
perform one of the following:
adjust the measured active time only if the standard deviation of the plurality of stretch factors does not exceed a threshold; and
request a new time stamp instead of adjusting the measured active time if the standard deviation of the plurality of stretch factors exceeds a threshold.

39. The memory device of claim 33, wherein determining accuracy of active time previously measured by the memory device comprises determining a plurality of stretch factors and calculating a running average of the plurality of stretch factors.

40. The memory device of claim 33, wherein determining accuracy of time previously measured by the memory device comprises comparing down time with actual time between two discrete time stamps.

41. The memory device of claim 33, wherein determining accuracy of active time previously measured by the memory device comprises comparing active time previously measured by the memory device with down time.

42. The memory device of claim 33, wherein determining accuracy of active time previously measured by the memory device comprises determining a stretch factor per power cycle of the memory device, wherein the circuitry is further operative to measure a number of power cycles with respect to a received time stamp, and wherein measured active time is adjusted using the stretch factor per power cycle and the number of power cycles.

43. The memory device of claim 33, wherein active time is measured by incrementing a value in a time counter in response to an interrupt signal, and wherein the measured active time is adjusted by multiplying the value in the time counter by an amount based on the accuracy of active time previously measured by the memory device instead of by a frequency at which the interrupt signal is generated.

44. The memory device of claim 33, wherein active time is measured by incrementing a value in a time counter in response to an interrupt signal and multiplying the value in the time counter by a frequency at which the interrupt signal is generated, and wherein the measured active time is adjusted by multiplying the measured active time by an amount based on the accuracy of active time previously measured by the memory device.

45. The memory device of claim 33, wherein the circuitry is further operative to receive a time stamp.

46. The memory device of claim 45, wherein the time stamp is signed by the time server.

47. The memory device of claim 33, wherein the memory device stores digital rights management (DRM) keys and licenses to unlock protected content stored on the memory device.

48. The memory device of claim 33, wherein the circuitry is further operative to adjust measured time in one or more of the following operations: an authentication operation, a host revocation operation, and a digital rights management (DRM) operation.

* * * * *